(12) United States Patent  
Isshiki et al.

(10) Patent No.: US 8,121,000 B2  
(45) Date of Patent: Feb. 21, 2012

(54) OPTICAL DISK APPARATUS

(75) Inventors: Fumio Isshiki, Yokohama (JP); Hideki Maruyama, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 12/776,480

(22) Filed: May 10, 2010

(65) Prior Publication Data

US 2011/0063957 A1 Mar. 17, 2011

(30) Foreign Application Priority Data

Sep. 16, 2009 (JP) ................................. 2009-214014

(51) Int. Cl. *G11B 7/00* (2006.01)
(52) U.S. Cl. ................. 369/44.27; 369/44.11; 369/44.28
(58) Field of Classification Search ............... 369/44.11, 369/44.28, 44.27
See application file for complete search history.

(56) References Cited

U.S. PATENT DOCUMENTS

| 6,314,066 B1* | 11/2001 | Hong et al. ................ 369/44.28 |
| 2010/0080106 A1* | 4/2010 | Nagatomi et al. ........ 369/112.26 |
| 2010/0271926 A1* | 10/2010 | Nagatomi ................ 369/112.23 |

FOREIGN PATENT DOCUMENTS

JP 2006-294189 10/2006

* cited by examiner

*Primary Examiner* — Adam R Giesy  
(74) *Attorney, Agent, or Firm* — Antonelli, Terry, Stout & Kraus, LLP.

(57) ABSTRACT

In an optical disk apparatus, an optical pickup includes an actuator for driving an object lens, and a sensed signal output part for making it possible to generate a tracking error signal and a lens error signal by addition/subtraction, and a signal processor includes a servo signal generator for generating a tracking error signal and a lens error signal on the basis of a signal supplied from the sensed signal output part, and a tracking offset correction quantity signal generator supplied with the lens error signal to output a tracking offset correction quantity signal. DC (direct current) offset correction is conducted by conducting addition/subtraction between the tracking error signal and both the lens error signal and the tracking offset correction quantity signal.

9 Claims, 7 Drawing Sheets

FIG.4A
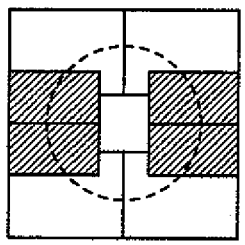
FIG.4B
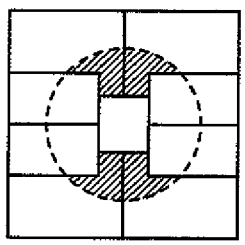
FIG.4C
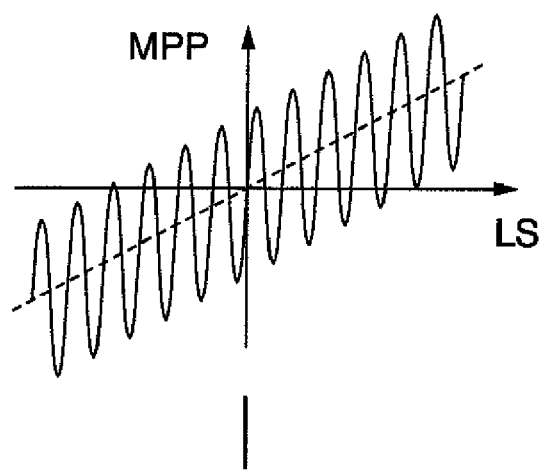
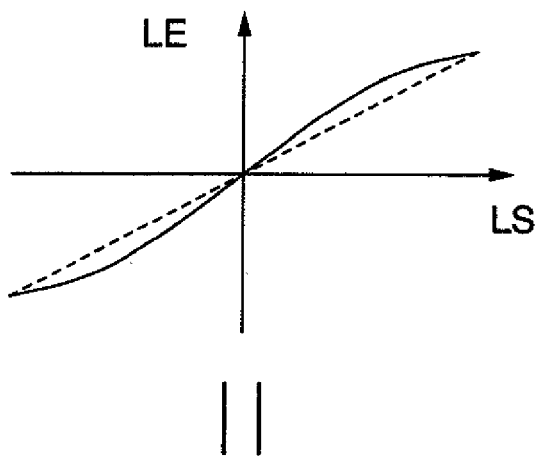
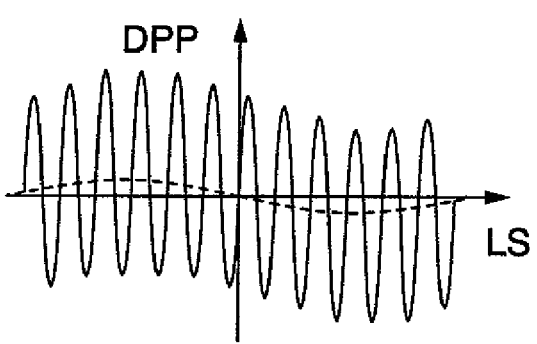

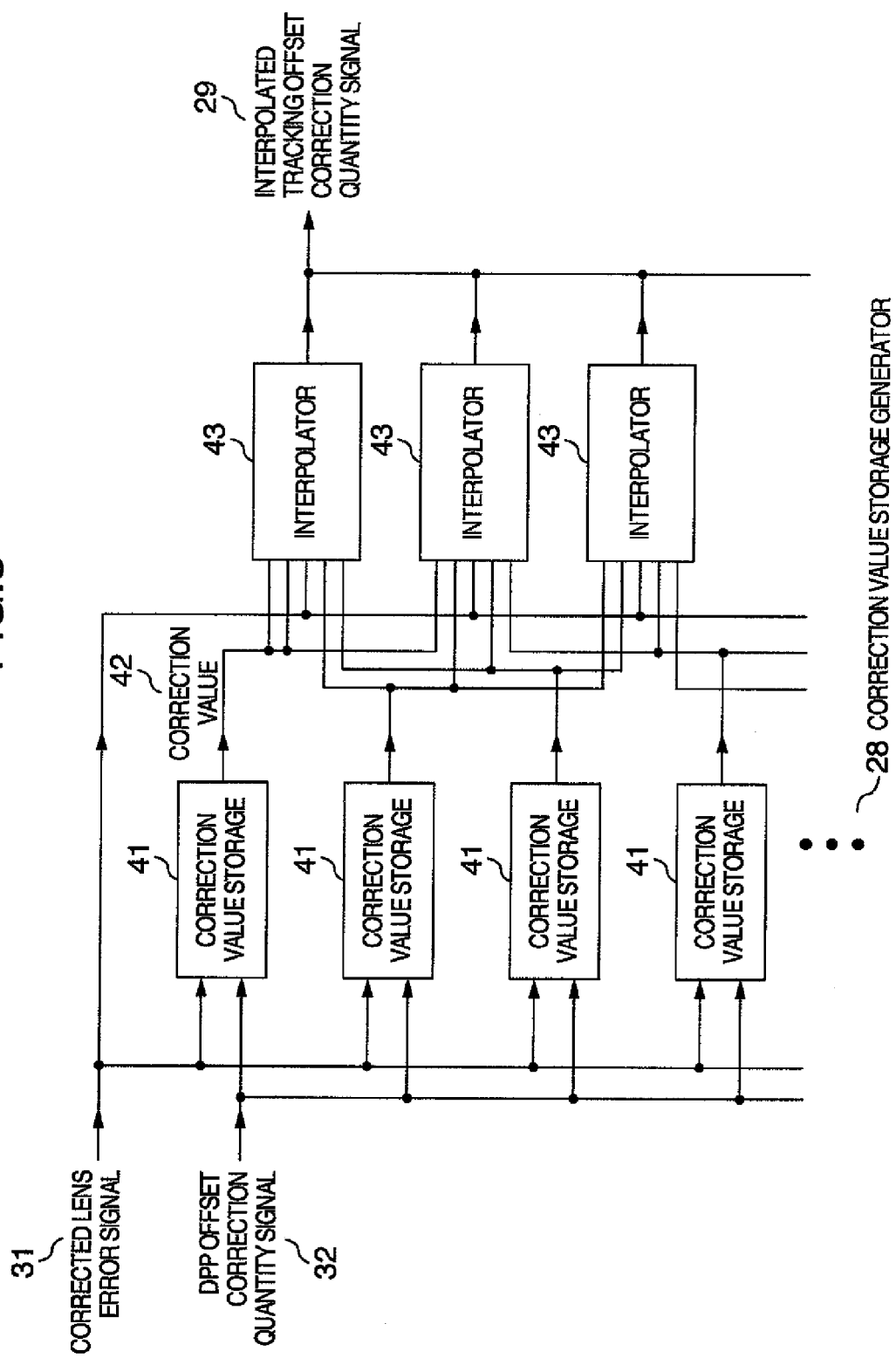

OPTICAL DISK APPARATUS

INCORPORATION BY REFERENCE

The present application claims priority from Japanese application JP2009-214014 filed on Sep. 16, 2009, the content of which is hereby incorporated by reference into this application.

BACKGROUND OF THE INVENTION

The present invention relates to an optical information recording-reproducing apparatus, and in particular to an optical disk apparatus. However, the present invention can be applied to general apparatuses using an optical servo function in which tracking control is exercised by using an optical signal.

As a background art, there is a technique disclosed in JP-A—2006-294189. "PROBLEM TO BE SOLVED" is described in JP-A-2006-294189 to be "to provide a tracking control method of an optical disk device capable of correcting off-set of a tracking error signal with high precision even when there are nonlinear characteristics e.g. wherein a shift amount of a position of an objective lens to a mechanically neutral position of the objective lens and an off-set amount of the tracking error signal are not proportional to each other, and to provide the optical disk device." As SOLUTION, there is description "In the tracking control method of the optical disk device performing control by using the tracking error signal, an optical pickup 4 is provided with the objective lens, the shift amount of the position of the objective lens to the mechanically neutral position of the objective lens is estimated and a correction signal of the tracking error signal is generated according to the estimated shift amount of the position of the objective lens by using any one of a plurality of correction functions."

SUMMARY OF THE INVENTION

An important factor for reliability of the optical disk apparatuses is the stability of the tracking servo control. A main factor determining the stability of the tracking servo control is the signal stability that a zero point of the tracking error signals agrees with a center of a recording information track correctly under various use conditions. A deviation from the zero point is called offset of the tracking error signal.

Ideally, the offset of the tracking error signal should be close to zero unlimitedly (no deviation). However, a deviation and an offset are caused by a manufacturing variation of a pickup, which is an optical head, or deviation of a medium such as a warp or undulation. Since the zero point of the signal deviates, it becomes impossible to conduct servo to the track center correctly and it becomes a cause of run off during the recording and reproduction of the disk.

As a measure for solving this problem, a method for correcting the offset which is the deviation quantity in signal processing is disclosed in, for example, JP 2006-294189 described above. However, there is a problem that a sufficient correction effect cannot be obtained due to an influence of vibration characteristics of the object lens actuator itself and the cost of the corrector becomes high.

The present invention has been made in order to solve the problem. An object of the present invention is to provide an optical disk apparatus in which the offset of the tracking error signal is corrected by signal processing at low cost certainly.

As an example, the object can be accomplished by invention described in claims.

In the optical disk apparatus according to the present invention, double correction effects are obtained fast by a combination of correction among pickup output signals and circuit side correction. Therefore, low-precision low-cost corrector can be used for the circuit side correction, and fine frequency characteristics are obtained.

Other objects, features and advantages of the invention will become apparent from the following description of the embodiments of the invention taken in conjunction with the accompanying drawings.

BRIEF DESCRIPTION OF THE DRAWINGS

FIGS. 4A, 4B and 4C are diagrams showing problems of signal processing in an optical disk apparatus using a one-beam method;

FIG. 5 is a diagram showing a detailed configuration example of a correction value storage generator;

DESCRIPTION OF THE EMBODIMENTS

Hereafter, an optical disk apparatus according to the present invention will be described. One of features of the optical disk apparatus according to the present invention is that the offset of the tracking error signal can be corrected simply and certainly on the circuit side according to learning information on the LSI side which is as little as several tens bytes by making the most of characteristics of the pickup output signal. The optical disk apparatus according to the present invention can be implemented by a combination of an optical pickup having a signal output corresponding to the correction and a signal processor having a correction processing function. Furthermore, a higher function and a higher reliability can be implemented with lower cost by incorporating the signal processor into a single integrated circuit chip having an error correction function.

Hereafter, embodiments of the present invention will be described with reference to FIGS. 1 to 7. For facilitating comprehension, components which exhibit the same action are partially denoted by the same reference numbers throughout the drawings.

The optical disk apparatus according to the present embodiment makes it possible to conduct tracking servo correctly by correcting the offset of the tracking error signal.

Figure 2A:
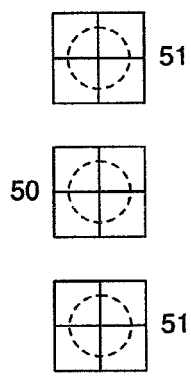
FIGS. 2A and 2B are diagrams showing a signal processing method in a conventional differential push-pull method.
Figure 2B:
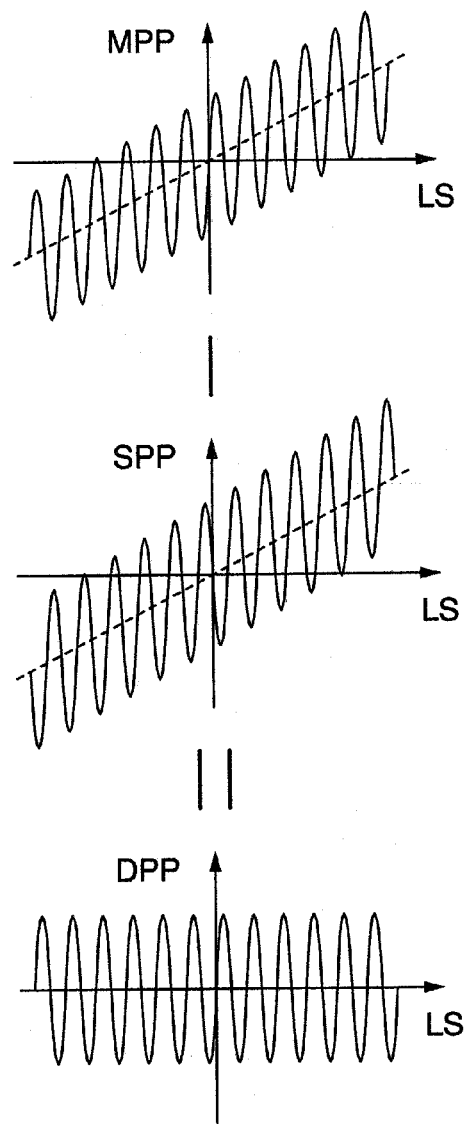
Figure 3A:
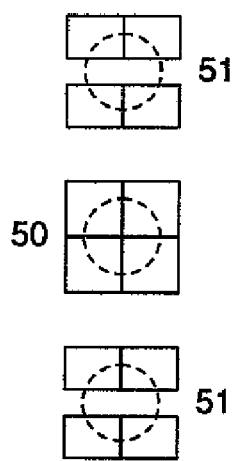
FIGS. 3A and 3B are diagrams showing problems of signal processing in an optical disk apparatus provided to cope with multi-layered disks.
Figure 3B:
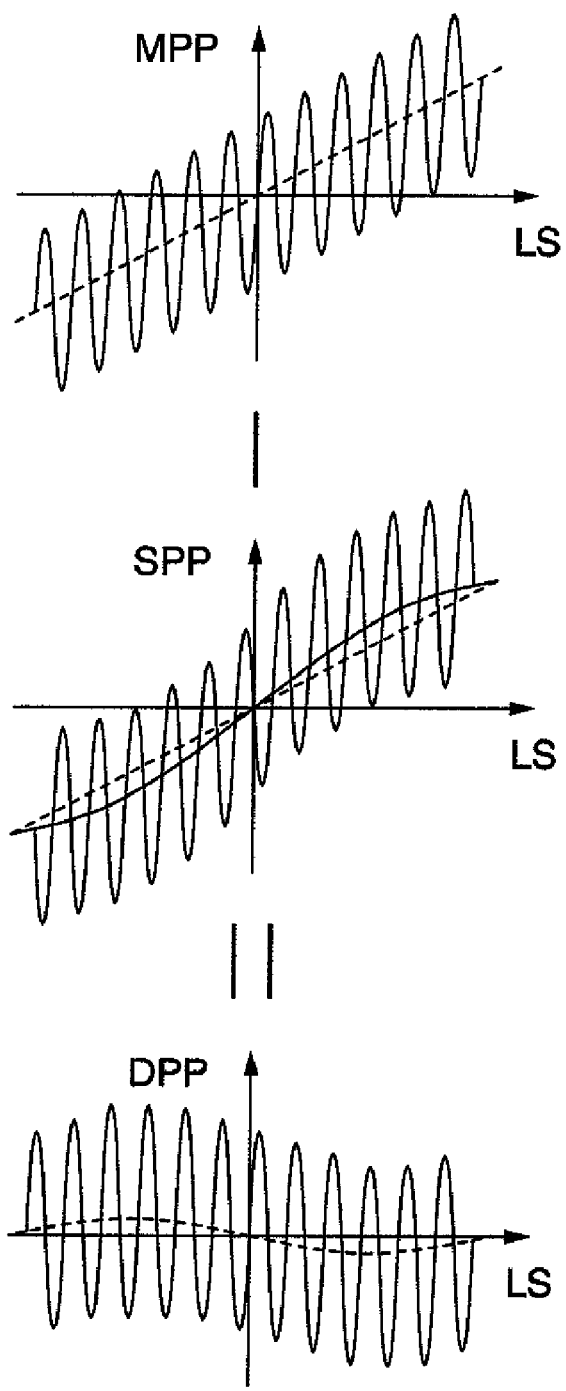

First, problems in the (conventional) optical disk apparatus will now be described with reference to FIGS. 2A and 2B. In order to trace the track correctly even if there is disk eccentricity, signal correction for correcting the tracking error signal used for the servo with respect to a lens center deviation (lens shift: LS) caused by the eccentricity is conducted in the (conventional) optical disk apparatus. For example, in the case of a three-spot method, the so-called differential push-pull (DPP) method is used. According to the differential push-pull (DPP) method, two sub spot photodetector planes 51 are disposed on both sides of a main spot photodetector planes 50 as shown in FIG. 2A, and an offset in a push-pull signal (main push-pull signal: MPP) detected in the main spot photodetector planes is canceled and corrected by obtaining a difference between the push-pull signal (main push-pull signal: MPP) and a push-pull signal (sub push-pull signal: SPP) detected in a sub spot photodetector planes. This corrected push-pull signal is called differential push-pull signal (DPP). Generally, the vertical variation (offset) in the DPP signal caused by the lens shift disappears in the differential push-pull signal adjusted correctly, as shown in FIG. 2B. In a multi-layer optical disk having recording layers of at least two or three layers in recent years, however, it has become necessary to use photodetectors in which the central part of the sub spot area is removed as shown in FIG. 3A in order to take a countermeasure to the stray light. In this case, the main spot differs from the sub spots in the photodetector shape. If the spots vary due to a lens shift, therefore, an imbalance occurs between the MPP signal and the SPP signal. Especially in the SPP signal, a non-linear vertical variation (offset) is caused by the lens shift. As a result, a non-linear offset to the lens shift occurs in a signal obtained by using the conventional DPP method, and tracking servo becomes apt to run off in some cases.

A similar problem also occurs in a tracking error signal generation method called one-beam method. Each of FIG. 4A and FIG. 4B shows an example of a diffraction grating pattern used in the one-beam method. Shaded parts in FIG. 4A represent a pattern corresponding to generation of the MPP signal. Shaded parts in FIG. 4B represent a pattern corresponding to generation of the lens error signal (LE signal) which corresponds to the amount of lens displacement (shift) or to the SPP signal. Because of the difference of the pattern shapes, a non-linear offset of the DPP signal as shown in FIG. 4C occurs for a large lens shift. Hereafter, this non-linearly caused offset is referred to as nonlinear offset. On the other hand, a straight-line change of the offset is referred to as linear offset.

In general, the linear offset can be canceled to nearly zero, if adjustment is conducted properly by using the DPP method. However, the nonlinear offset cannot be corrected completely, and a nonlinear component remains. The optical disk apparatus according to the present embodiment can correct the nonlinear offset component.

Figure 1:
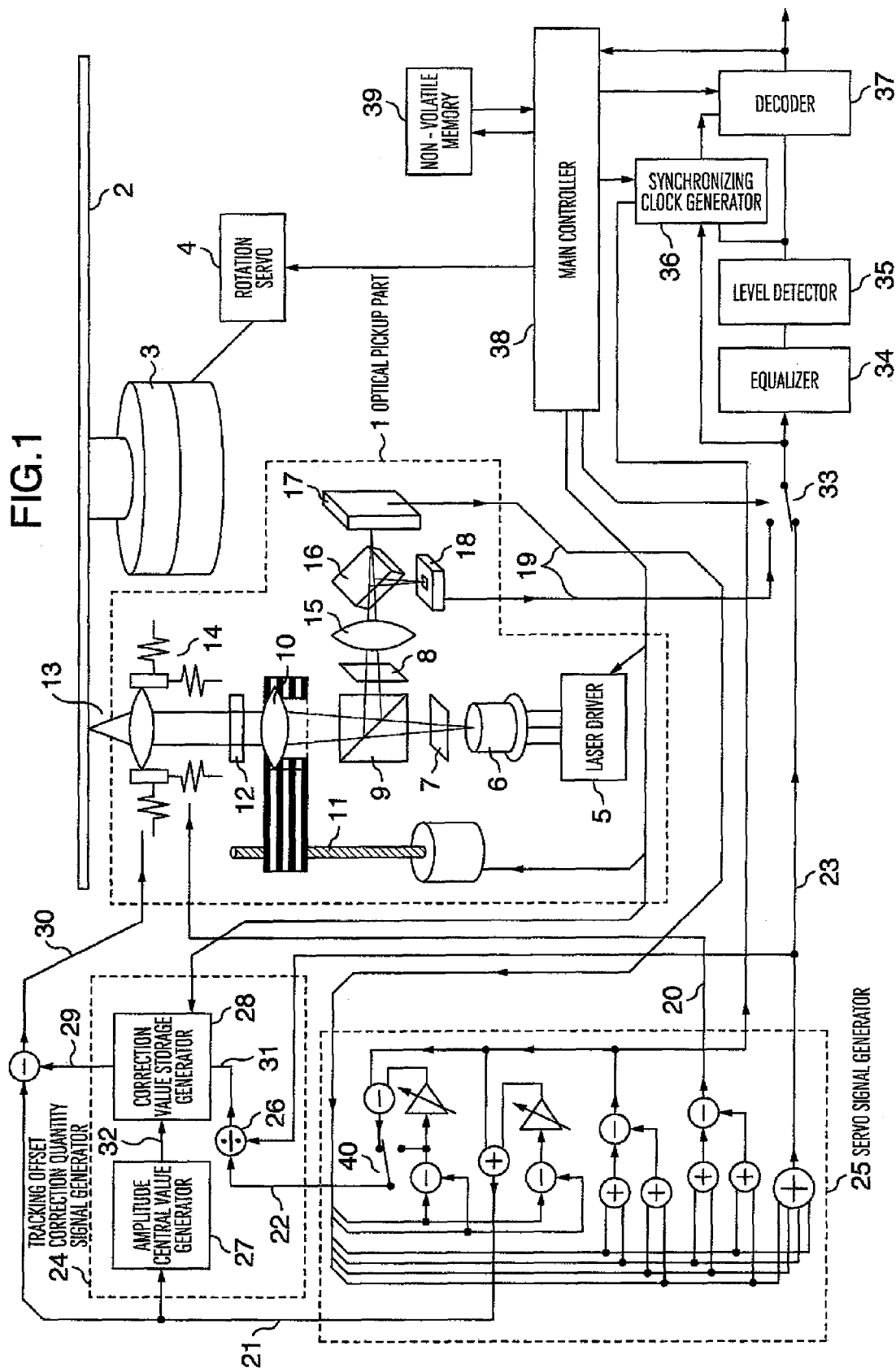
FIG. 1 is a diagram showing an example of an optical disk apparatus according to the present invention.

An embodiment of a general configuration of an information reproducing apparatus according to the present invention will now be described with reference to FIG. 1.

As for the general configuration, the information reproducing apparatus includes an optical pickup part 1, a mechanism part including an optical disk 2, which is a medium, and a spindle motor 3, and a remaining signal processor part.

The optical disk 2, which is a recording medium, is mounted on the spindle motor 3 which rotation velocity is controlled by a rotation servo 4. The medium is irradiated with light from a semiconductor laser 6 which is driven by a laser driver 5.

The light from the semiconductor laser 6 is passed through a diffraction grating 7 for the three-spot method, and divided into three beams. In the case of a one-beam method, this diffraction grating is not provided and instead a diffraction grating 8 is provided on a return path side. Returning back to the case of the three-beam method, the light passed through the diffraction grating 7 passes through a polarization beam splitter 9 and proceeds to a collimate lens 10. The collimate lens 10 is held on a movable part in a lens drive mechanism, and is configured to be able to be moved in a direction parallel to an optical axis by a stepping motor 11. The light passed through the collimate lens 10 is passed through a $\lambda/4$ plate 12, focused by an object lens 13, and applied onto the optical disk 2, which is the recording medium. The object lens 13 is attached onto an actuator 14, and its focus position can be driven in a focus direction and a track direction by a signal from a servo signal generator 25. A part of the applied light is reflected by the disk 2, passed through the object lens 13, passed through the $\lambda/4$ plate 12, passed through the collimate lens 10, and incident on the polarization beam splitter 9. At this time, polarization of the luminous flux is rotated by 90°, because it has passed through the $\lambda/4$ plate 12 twice. As a result, the luminous flux is reflected by the polarization beam splitter 9. (In the case of the one-beam method, the light is passed through the diffraction grating 8 at this time.) The light proceeds to a detection lens 15. The light passed through the detection lens 15 is passed through a semi-transparent mirror 16, detected at a detection surface on a light sensing device 17, and converted to an electric signal. In order to improve the signal-to-noise ratio (S/N ratio) of the reproduced signal, the semi-transparent mirror 16 is inserted between the detection lens 15 and the light sensing device 17, and a reproduced signal detector 18 having a high S/N is juxtaposed.

An electric signal obtained by the conversion on the light sensing device 17 is amplified by an optical current amplifier in the light sensing device, and a light sensing signal 19 is output. The servo signal generator 25 generates a focus error signal 20, a tracking error signal 21, a lens error signal 22, and a reproduced signal 23 (RF signal) from the light sensing signal 19. In the present example, the focus error is detected by using an astigmatism method with a quadrant photo-detector as the three-beam method. In the case of the one-beam method, the focus error signal is detected by using the knife edge method.

A tracking offset correction quantity signal generator 24 outputs a tracking offset correction quantity signal 29 on the basis of the tracking error signal 21, the lens error signal 22, and the reproduced signal 23 (RF signal), which are output by the servo signal generator 25. A switch 40 conducts switching between the three-beam method and the one-beam method. FIG. 1 shows a state in which the switch 40 has been changed over to the three-beam method side. The tracking offset correction quantity signal generator 24 first generates a lens error signal 31 corrected in total light quantity by using a divider 26 on the basis of the lens error signal 22 and the reproduced signal 23 (RF signal). This is useful to raise the precision of the correction according to the present invention by preventing false detection of the lens shift quantity caused by a variation of the total reproduced light quantity. An amplitude central value generator 27 generates an upside envelope signal depending upon maximum value peak detection and a downside envelope signal depending upon minimum value peak detection on the basis of a push-pull signal obtained from the tracking error signal 21 at the time of tracking servo off. The amplitude central value generator 27 generates a DPP offset correction quantity signal 32 ($\Delta$DPP) by finding an average value of the upside envelope signal and the downside envelope signal. A correction value storage generator 28 stores, reads out and interpolates the DPP offset correction quantity signal 32 ($\Delta$DPP), which is output from the amplitude central value generator 27, in accordance with a signal value of the lens error signal 31 corrected in total light quantity, which is output from the divider 26, and outputs the tracking offset correction quantity signal 29. A tracking error signal 30 corrected in DC offset for driving the actuator 14 is generated by conducting addition/subtraction on the tracking offset correction quantity signal 29 and the tracking error signal 21 for the purpose of correction.

Either the reproduced signal 23 reproduced from the disk 2 or an output of the reproduced signal detector 18 is selected by a switch 33. After being selected, the reproduced signal 23 is supplied to a decoder 37 via an equalizer 34, a level detector 35 and a synchronizing clock generator 36. In the decoder 37, the reproduced signal 23 is converted to the recorded original digital signal. At the same time, the synchronizing clock generator 36 directly detects the synthesized reproduced signal, generates a synchronizing signal, and supplies the synchronizing signal to the decoder 37. A series of these circuits are controlled generally by a main controller 38. In the present configuration, a non-volatile memory 39 is included. The non-volatile memory 39 retains initial parameters of the optical pickup required for the correction even during the time period in which the power supply is in the off state. As a result, initialization operation can be conducted fast by utilizing results learned the last time. The main controller 38 detects the rotation period of the spindle as well, and consequently the learning can be conducted in synchronism with the rotation of the spindle. A higher precision and a faster speed of the correction are reconciled by measuring a push-pull variation of one round every rotation of the spindle and conducting the learning.

A configuration of the correction value storage generator 28 will now be described in detail with reference to FIGS. 5 and 6.

FIG. 5 shows a detailed configuration of the correction value storage generator 28. The correction value storage generator 28 conducts storage and interpolation processing of a DPP offset quantity to be corrected, in accordance with a lens shift quantity (which is a lens error signal value before correction here). Among a plurality of correction value storages 41, one storage corresponding to a range of the value of the lens error signal 31 corrected in total light quantity functions to store the DPP offset correction quantity signal 32 (ΔDPP), which is input thereto, during learning at the time of focus servo on and tracking servo off. A correction value 42 which is stored is output to interpolators 43. Among interpolators 43, an interpolator which has coincided in the corresponding interpolation range outputs a tracking offset correction quantity signal 29 which has been interpolated, by using the stored correction values 42 at four neighboring points and the lens error signal 31 corrected in total light quantity. As a result, an interpolated waveform output obtained by smoothly coupling points of the stored correction values is generated as an output of the correction value storage generator 28.

Figure 6:
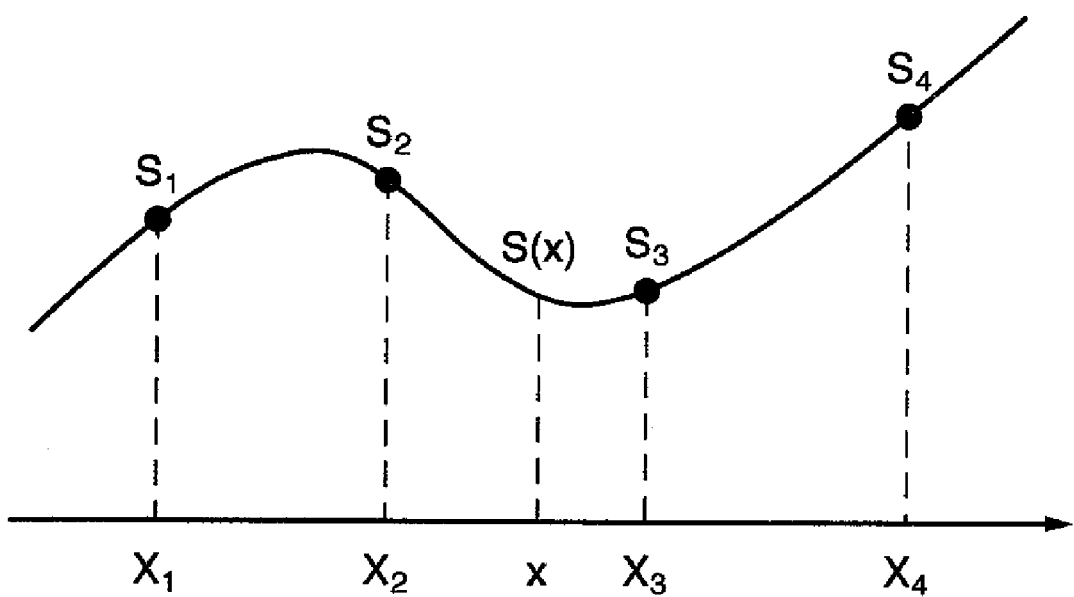
FIG. 6 is a diagram for explaining operation of interpolators.

FIG. 6 shows an internal operation of the interpolators 43. The interpolation processing is conducted by using the spline-method processing. Denoting the lens error signal 31 corrected in total light quantity by x and the stored correction value 42 by S, calculated values of the spline processing are approximated by a smooth function of the third degree as shown in FIG. 6 and output.

At the time of learning, "a", "b", "c" and "d" are found by using the following equation every section.

$$\begin{pmatrix} a \\ b \\ c \\ d \end{pmatrix} = \begin{pmatrix} X_1^3 & X_1^2 & X_1 & 1 \\ X_2^3 & X_2^2 & X_2 & 1 \\ X_3^3 & X_3^2 & X_3 & 1 \\ X_4^3 & X_4^2 & X_4 & 1 \end{pmatrix}^{-1} \begin{pmatrix} S_1 \\ S_2 \\ S_3 \\ S_4 \end{pmatrix} \quad \text{Expression 1}$$

Correction values are calculated and output by using the following equation while the tracking servo is on.

$$S(x) = ax^3 + bx^2 + cx + d \quad \text{Expression 2}$$

Timing at which learning is conducted is limited to time when a push-pull signal amplitude can be obtained. Therefore, the timing is limited to a time period over which the focus servo is on and the tracking servo is off. Since it is necessary to store values associated with respective lens shift quantities (lens error signals 31 corrected in total light quantity), the lens shift scan operation is conducted while the above-described servo conditions are satisfied. At the time of shipping of the optical disk apparatus, it is also possible to conduct the present learning beforehand. The learning can be conducted in the radial direction as well. High precision correction which copes with deviation of the medium better can be conducted by conducting the scan in the radial direction.

Figure 7:
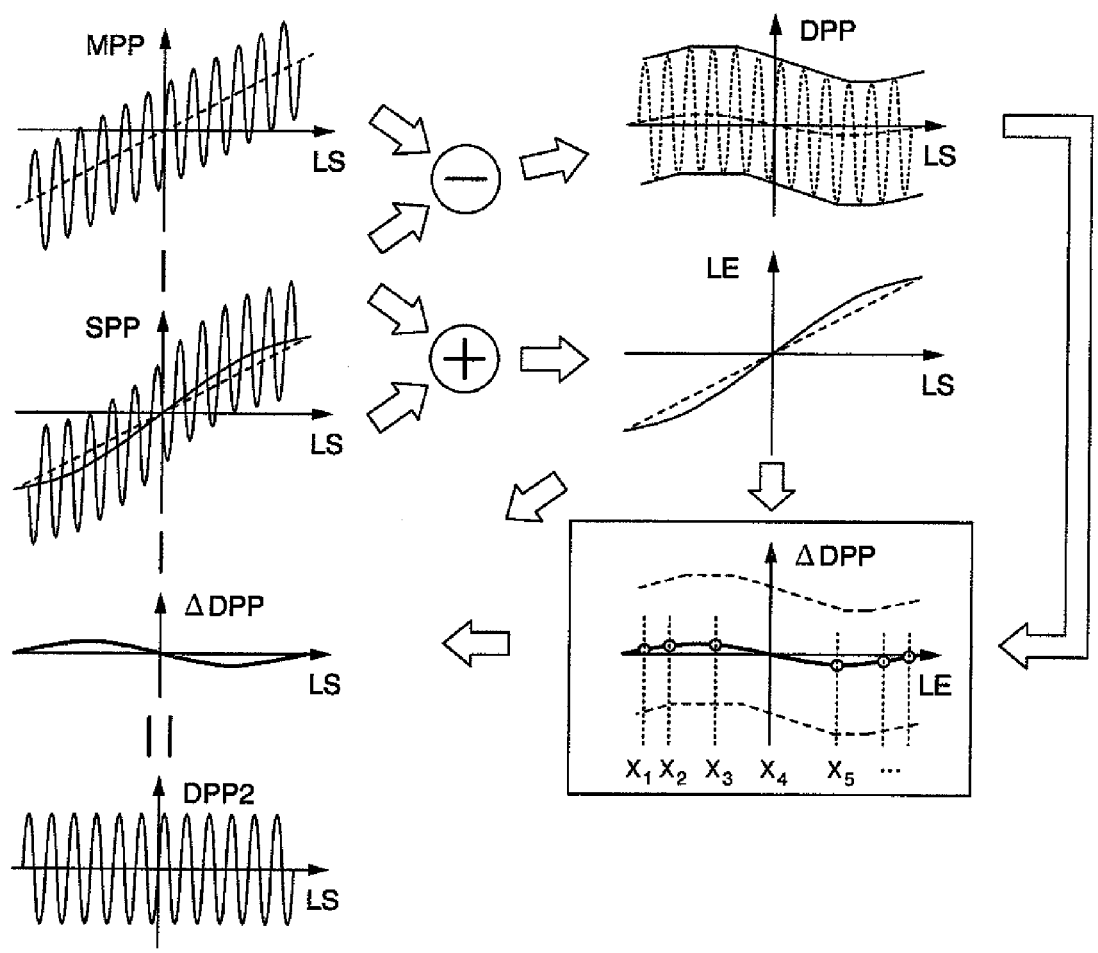
FIG. 7 is a schematic diagram for explaining a principle for correcting an offset of a tracking error signal in an embodiment.

The present configuration and its correction principle heretofore described are summed up as shown in FIG. 7. In the ordinary DPP method, the DPP signal and the LE signal are generated from the MPP signal and the SPP signal. In the present configuration, however, the amounts of nonlinear offset remaining in the DPP signal are learned and stored by using the LE signal as input during the tracking servo off, and then the tracking servo is turned on. While the recording operation or the reproducing operation continues, the correction value of nonlinear offset of the DPP signal is generated simultaneously with the spline interpolation on the basis of the LE signal (distorted lens shift quantity signal) obtained in real time. In this way, the vertical variation of the DPP signal is corrected.

In other words, in the present configuration, correction corresponding to a feature of the pickup such as lens shift depending curve characteristics of the tracking error signal is possible. In particular, nonlinear correction can be conducted at a low cost with high precision. When the error signal itself is made zero by feedback control, estimation during the tracking servo on becomes impossible in the conventional art. On the other hand, accurate calculation of the correction value is possible, because the shift quantity can be detected during the tracking servo on as well. Furthermore, the lens shift quantity signal is first generated, and a correction quantity signal is generated on the basis of the lens shift quantity signal. As a result, the correction quantity signal can be generated by only addition and subtraction on the signal, and consequently the attenuator is unnecessary and the cost is low. Furthermore, since the mechanically neutral position precision of the object lens is unnecessary, the learning result is not disturbed by the influence of vibration in the neighborhood. Accurate learning and correction are possible even under vibration such as on an automobile. Since only a nonlinear component of the lens shift quantity signal is corrected, the precision of the tracking error signal correction is improved. The number of bits stored as a value for correction and the number of bits for A/D conversion can be reduced. Computation precision of linear interpolation for correction can also be reduced. Computation time (sampling rate) of the value for correction and the correction output response frequency can also be reduced, and the cost can be reduced. Furthermore, since the learning precision of the correction value can be made low, the time period required for leaning can be shortened and preparation operation becomes fast.

In the present configuration, correction which copes with a manufacturing variation of an individual pickup as well can be conducted by the learning at low cost.

It is possible to grasp the variation in the round with high reproducibility even on a disk having nonuniformity depending upon the rotation direction and conduct stable correction value learning by conducting learning in synchronism with the disk rotation.

It is possible to grasp the variation over the whole round of the disk fastest and conduct stable correction value learning by conducting learning at one point every rotation of the spindle.

In the present configuration, it is possible to conduct correction value learning in which stable control coping with individual deviation of the disk is possible, by conducting correction value learning which copes with deviation (warp, undulation and film thickness change) of the disk corresponding to a position in the radial direction of the disk.

Since learning is conducted by using the spline interpolation, high precision optimum correction values can be predicted with the number of lens shift positions for learning reduced to the minimum. Accordingly, the time period required for the learning can be held down to the minimum, and the preparation operation of the optical disk can be made fast. It is possible to prevent an abnormal correction value due to noise by previously conducting fitting processing on the correction values and conducting averaging, and the precision of the control can be made high. Furthermore, since the processing after the tracking servo turns on can be previously finished, the servo processing can be conducted fast.

In the present configuration, high precision optimum correction values can be predicted while holding down the number of lens shift positions for learning to the minimum. Accordingly, the preliminary operation of the optical disk can be made fast with the time period required for the learning held down to the minimum. It is possible to prevent an abnormal correction value due to noise by previously conducting fitting processing on the correction values and conducting averaging, and the precision of the control can be made high. Furthermore, since the processing after the tracking servo turns on can be previously finished, the servo processing can be conducted fast.

In the present configuration, correction based on total reproduced light quantity is conducted on the lens error signal. Therefore, a signal depending upon an accurate lens shift position can be obtained from the correction by a combination of the correction based on the total reproduced light quantity and the corrector of the lens shift quantity signal itself regardless of a difference between recorded areas and unrecorded areas on the disk and a difference of the operation condition such as recording and reproducing. Therefore, an accurate tracking offset correction quantity signal having high reproducibility is obtained, and the precision of the correction can be made high.

The present configuration can be used in the one-beam scheme as well. In the one-beam scheme, the visual field (deviation between an outward trip and a return trip of a luminous flux in effective beam radius) changes with the lens shift in principle. Usually as compared with other schemes such as the three-beam scheme, therefore, the nonlinearity of the lens shift quantity signal change is great and the improvement effect of the nonlinear component correction is great.

The present configuration can also be used in the three-beam scheme having a photodetector plane in which the central part of the sub spot is removed. Usually in the three-beam scheme, the linearity of the lens shift quantity signal change with respect to the lens shift is comparatively fine and consequently the nonlinearity is small. In the case of the modified three-beam scheme in which the central part of the sub-spot photodetector area is removed to take a measure to counter two-layer interference light, however, the sub spot differs in photodetector plane shape from the main spot. Usually, as compared with other schemes such as the three-beam scheme, therefore, the nonlinearity of the lens shift quantity signal change caused by the lens shift is great and the improvement effect of the nonlinear component correction is great.

The present configuration can bring about great effects to multi-layer optical disks as well. In the multi-layer optical disks, a symptom that the nonlinearity and strain of the tracking offset at the time of lens shift obtained in each layer differs from layer to layer due to the influence of reflected light and stray light between layers occurs. Even when the multi-layer optical disk medium is used, it is possible to make the most of the effects of the present correction and obtain fine tracking servo stability by conducting corrections in respective layers.

The present invention can also be applied to, for example, other optical recording apparatuses in which tracking detection is conducted by utilizing interference.

The present invention is not restricted to the above-described embodiments, but various modifications are included. For example, the embodiments have been described in detail in order to describe the present invention intelligibly. The present invention is not necessarily restricted to embodiments including all described configurations. A part of the configuration of an embodiment can also be replaced by a configuration of another embodiment. It is also possible to add a configuration of an embodiment to a configuration of another embodiment. On a part of a configuration of each embodiment, it is possible to conduct addition, deletion and substitution of another configuration.

A part or the whole of each of the configurations may be formed of hardware, or may be formed to be implemented by executing a program in a processor. As for control lines and information lines, those considered to be necessary in description are shown, and all control lines and information lines are not necessarily shown in the product. As a matter of fact, it may be considered that almost all configurations are connected to each other.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk apparatus comprising an optical pickup and a signal processor,
   wherein
   the optical pickup comprises:
   an actuator for driving an object lens; and
   a sensed signal output part for outputting a sensed signal to the signal processor,
   the signal processor comprises:
   a servo signal generator for generating a tracking error signal and a lens error signal by conducting addition/subtraction of the sensed signal supplied from the sensed signal output part; and
   a tracking offset correction quantity signal generator which is input with the lens error signal to output a tracking offset correction quantity signal;
   wherein DC (direct current) offset correction is conducted by conducting addition/subtraction between the tracking error signal and both the lens error signal and the tracking offset correction quantity signal;
   wherein the tracking offset correction quantity signal generator comprises storage means for storing a plurality of tracking offset correction values respectively associated with a plurality of lens shift positions; and
   wherein the plurality of tracking offset correction values respectively associated with the plurality of lens shift positions are stored in the storage means by learning operation before start of reproducing operation or before start of recording operation.

2. The optical disk apparatus according to claim 1, wherein
the learning operation is conducted in a state of tracking servo off when focus servo is on, and
the learning operation is conducted by scanning the plurality of lens shift positions in synchronism with rotation of a spindle for rotating a disk, detecting an amplitude envelope of the detected tracking error signal, and storing tracking offset correction values.

3. The optical disk apparatus according to claim 2, wherein the learning operation is executed a plurality of times in different disk radial positions.

4. The optical disk apparatus according to claim 1, wherein
the learning operation is conducted in a state of tracking servo off when focus servo is on, and
the learning operation is conducted by scanning the plurality of lens shift positions at a rate of one point per rotation of the spindle, detecting an amplitude envelope of the detected tracking error signal, and storing tracking offset correction values.

5. The optical disk apparatus according to claim 1, wherein the tracking offset correction quantity signal generator conducts spline interpolation on correction values in the plurality of lens shift positions for which the tracking offset correction values are stored, and generates the tracking offset correction quantity signal.

6. The optical disk apparatus according to claim 1, comprising a lens error signal corrector for correcting the lens error signal on the basis of sum total of sensed signal outputs.

7. The optical disk apparatus according to claim 1, wherein the tracking error signal and the lens error signal are generated by using a one-beam scheme.

8. The optical disk apparatus according to claim 1, wherein the tracking error signal and the lens error signal are generated by using a three-beam scheme in which a central part is removed in sub spot photodetector planes.

9. The optical disk apparatus according to claim 1, wherein
an optical disk medium corresponding to the optical disk apparatus is a multi-layer optical disk medium having at least three recording surfaces, and
scanning is executed and correction learning is conducted in respective layers in the learning operation.

* * * * *